(12) United States Patent
Ohara (10) Patent No.: US 12,504,296 B2
(45) Date of Patent: Dec. 23, 2025

(54) PROCESSOR AND PROCESSING METHOD

(71) Applicant: MICWARE CO., LTD., Hyogo (JP)

(72) Inventor: Yuji Ohara, Hyogo (JP)

(73) Assignee: MICWARE CO., LTD., Hyogo (JP)

(*) Notice: Subject to any disclaimer, the term of this patent is extended or adjusted under 35 U.S.C. 154(b) by 77 days.

(21) Appl. No.: 18/618,097

(22) Filed: Mar. 27, 2024

(65) Prior Publication Data

US 2024/0230359 A1 Jul. 11, 2024

Related U.S. Application Data

(63) Continuation of application No. PCT/JP2022/038632, filed on Oct. 17, 2022.

(30) Foreign Application Priority Data

Nov. 5, 2021 (JP) ................. 2021-181409

(51) Int. Cl.
*G01C 21/36* (2006.01)
*G01C 21/34* (2006.01)

(52) U.S. Cl.
CPC ..... *G01C 21/3673* (2013.01); *G01C 21/3492* (2013.01)

(58) Field of Classification Search
CPC .............. G01C 21/30; G01C 21/3694
USPC ......................................... 701/423
See application file for complete search history.

(56) References Cited

FOREIGN PATENT DOCUMENTS

| JP | 2005043911 A | * | 2/2005 |
| JP | 2005-300394 A | | 10/2005 |
| JP | 2016-540981 A | | 12/2016 |
| WO | 2015/082639 A1 | | 6/2015 |

OTHER PUBLICATIONS

Machine translation JP2005043911 (Year: 2005).*
International Search Report issued in PCT/JP2022/038632 mailed on Dec. 6, 2022 with English Translation (5 pages).
Written Opinion of International Searching Authority mailed on PCT/JP2022/038632 mailed on Dec. 6, 2022 with English Translation (6 pages).

* cited by examiner

*Primary Examiner* — Navid Z. Mehdizadeh
*Assistant Examiner* — Vincent Feng
(74) *Attorney, Agent, or Firm* — Nakanishi IP Associates, LLC (57) ABSTRACT

A processor stores map data that includes position data on a plurality of intersections connected to a plurality of roads; receives road traffic information that includes starting-point position data indicating a starting point of a first zone, end-point position data indicating an end point of the first zone, first distance information indicating a length of the first zone, and second distance information indicating a length from a starting point or end point to a start position or a tail end of a caution zone where there is a traffic jam or traffic control; and displays a map that shows the caution zone by the length corrected and indicated by the corrected second distance information.

3 Claims, 9 Drawing Sheets

| Starting point | Coordinates(WGS84) | 139.XXX, 36.XXX |
|---|---|---|
| | Direction | 30 |
| | Road type | Open road |
| End point | Coordinates(WGS84) | 139. YYY, 36.YYY |
| | Direction | 0 |
| | Road type | Open road |
| Total road length (m) | | 1250 |
| Number of caution zones 50 | | 2 |
| First caution zone 56 | Distance (m) from starting point 54 to tail end 59 | 650 |
| | Length (m) of caution zone 56 | 150 |
| Second caution zone 57 | Distance (m) from starting point 54 to tail end 59 | 1000 |
| | Length (m) of caution zone 57 | 250 |

| Item | Value |
|---|---|
| Length (m) of second zone 73 | 1000 |
| Number of intersections 51 in second zone 73 | 3 |
| First intersection 51 (m) | 0 |
| Second intersection 51 (m) | 620 |
| Third intersection 51 (m) | 1000 |

(b)

| Values indicated by corrected information on reception side | | | Values indicated by uncorrected information on transmission side |
|---|---|---|---|
| First caution zone 56 | Corrected tail end 59 (m) | 520 | 650 |
| | Length (m) of caution zone 56 | 120 | 150 |
| Second caution zone 57 | Corrected tail end 59 (m) | 800 | 1000 |
| | Length (m) of caution zone 57 | 200 | 250 |

(c)

| Values indicated by corrected information on reception side | | | Values indicated by uncorrected information on transmission side |
|---|---|---|---|
| First caution zone 56 | Corrected tail end 59 (m) | 520 | 650 |
| | Length (m) of caution zone 56 | 120 -> 100 | 150 |
| Second caution zone 57 | Corrected tail end 59 (m) | 800 | 1000 |
| | Length (m) of caution zone 57 | 200 | 250 |

PROCESSOR AND PROCESSING METHOD

CROSS-REFERENCE TO RELATED APPLICATIONS

This application is a continuation application of International Patent Application No. PCT/JP2022/038632 filed on Oct. 17, 2022, which claims priority to Japanese Patent Application No. 2021-181409 filed on Nov. 5, 2021, the entire contents of which are incorporated by reference.

TECHNICAL FIELD

The present invention relates to a technique for displaying a caution zone on a map in accordance with received road traffic information, the caution zone indicating a zone where there is a traffic jam or traffic control.

BACKGROUND ART

Patent Literature (PTL) 1 discloses a method of determining a geographic location, which is encoded using a first digital map, within the range of a second digital map by using a location reference.

PTL 2 discloses a technique that allows accurate transfer of position information on a specific point without causing a positional displacement even if different map databases are used on the transmission and reception sides.

CITATION LIST

Patent Literature

[PTL 1]
Japanese Unexamined Patent Application Publication (Translation of PCT Application) No. 2016-540981
[PTL 2]
Japanese Unexamined Patent Application Publication No. 2005-300394

SUMMARY OF INVENTION

One or more aspects of the present invention correct a displacement of a display position of a caution zone on a map through more simplified processing, the displacement occurring when map data stored in a server that transmits road traffic information differs from map data stored in a processor that receives the road traffic information.

(1) A processor according to a first aspect of the present disclosure includes a communicator, a storage, a display, and a controller. The communicator receives road traffic information that includes starting-point position data, end-point position data, first distance information, and second distance information, the starting-point position data indicating a starting point of a first zone, the end-point position data indicating an end point of the first zone, the first distance information indicating a length of the first zone, the second distance information indicating a length from either the starting point or the end point to either a start position or a tail end of a caution zone where there is a traffic jam or traffic control. The storage stores map data that includes position data on a plurality of intersections connected to a plurality of roads. The display displays a map in accordance with the map data.

The controller identifies a first intersection whose distance from the starting point satisfies a predetermined condition and a second intersection whose distance from the end point satisfies a predetermined condition from the map data; calculates a distance ratio that is a ratio between the length of the first zone and a length of a road that connects the first intersection and the second intersection; when the distance ratio is smaller than a first reference value, determines the road as a second zone that corresponds to the first zone; calculates a distance correction value that is a ratio between the length of the first zone and a length of the second zone; corrects the length indicated by the second distance information by using the distance correction value; and causes the display to display the map that shows the caution zone by the length corrected and indicated by the second distance information.

The processor according to the first aspect causes the display to display a map that shows a caution zone by using the distance correction value, which is the ratio between the length of the first zone and the length of the second zone. It is thus possible to correct and resolve a displacement of a display position of the caution zone on the map.

(2) In the processor according to the first aspect of the present disclosure, the road traffic information may further include third distance information that indicates a length of the caution zone, and the controller may further correct the length of the caution zone by using the distance correction value and cause the display to display the map that shows the caution zone by the length corrected.

(3) In the processor according to the first aspect of the present disclosure, the map data may further include directional data that indicates a road direction of each of the plurality of roads, and road type data that indicates a road type of each of the plurality of roads, the road traffic information may further include first directional data that indicates a road direction of the first zone, and first road type data that indicates a road type of the first zone, and the predetermined condition may be any of a condition that an intersection is closest to the starting point or the end point, a condition that an intersection is connected to a road whose directional data indicates a road direction that matches the road direction indicated by the first directional data or that is within a predetermined angle including the road direction indicated by the first directional data, or a condition that an intersection is connected to a road whose road type data matches the first road type data.

(4) A processing method according to a second aspect of the present disclosure is a processing method for use in a processor that stores map data and displays a map in accordance with the map data, the map data including position data on a plurality of intersections connected to a plurality of roads. The processing method includes receiving road traffic information that includes starting-point position data, end-point position data, first distance information, and second distance information, the starting-point position data indicating a starting point of a first zone, the end-point position data indicating an end point of the first zone, the first distance information indicating a length of the first zone, the second distance information indicating a length from either the starting point or the end point to either a start position or a tail end of a caution zone where there is a traffic jam or traffic control; identifying a first intersection whose distance from the starting point satisfies a predetermined condition and a second intersection whose distance from the end point satisfies a predetermined condition from the map data; calculating a distance ratio that is a ratio between the length of the first zone and a length of a road that connects the first intersection and the second intersection; when the distance ratio is smaller than a first reference value, determining the road as a second zone that corresponds to the first zone; calculating a distance correction value that is a ratio between the length of the first zone and a length of the second zone; correcting a length indicated by the second distance information by using the distance correction value; and displaying the map that shows the caution zone by the length corrected and indicated by the second distance information.

ADVANTAGEOUS EFFECTS OF INVENTION

According to one or more aspects of the present invention, it is possible to correct a displacement of a display position of a caution zone on the map through more simplified processing, even if the map data stored in the server that transmits the road traffic information is different from the map data stored in the processor that receives the road traffic information.

DESCRIPTION OF EMBODIMENTS

Figure 1:
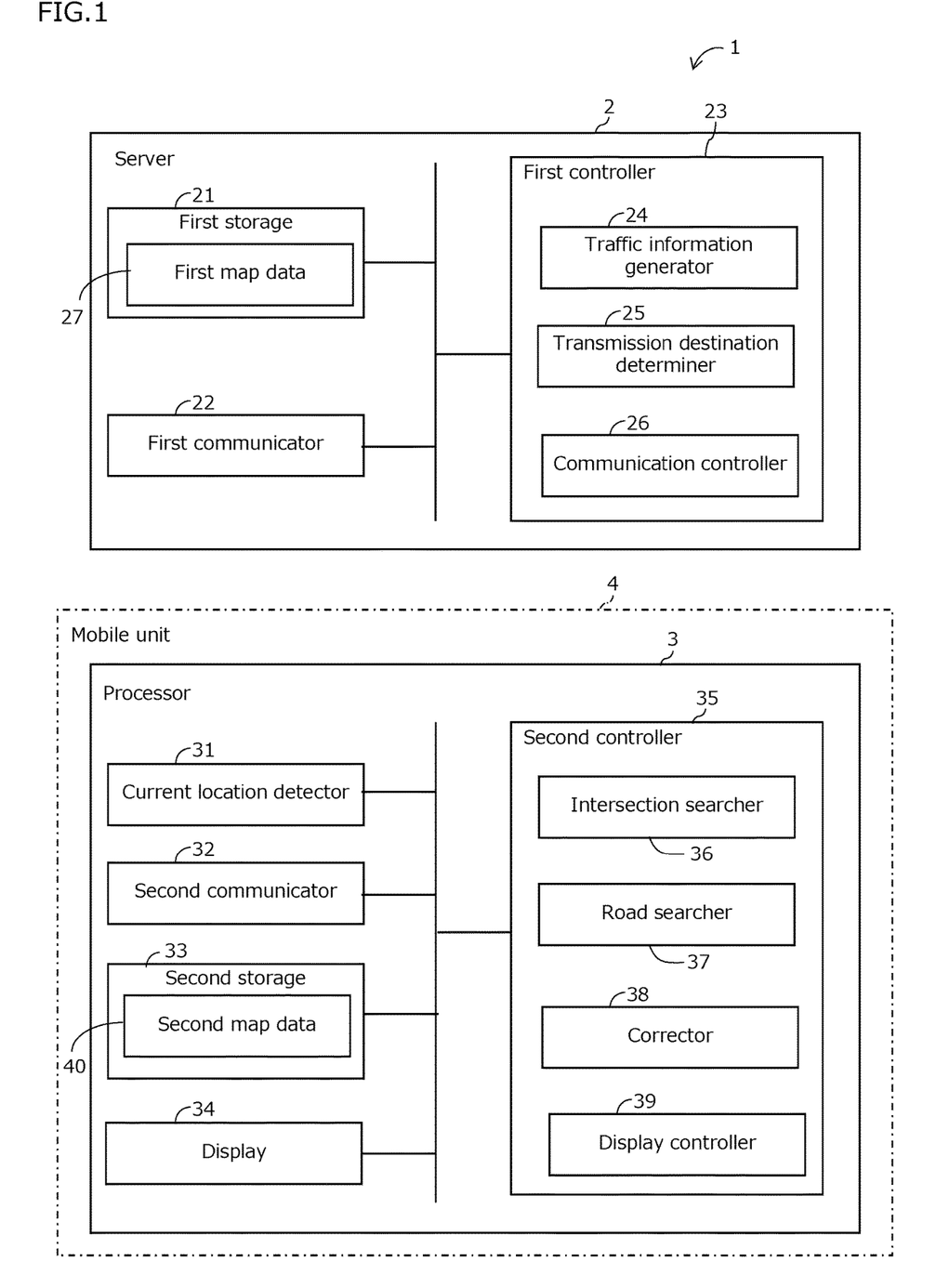
FIG. 1 is a diagram showing a schematic configuration of a processing system that includes a processor according to an embodiment of the present disclosure.

As shown in FIG. 1, a processing system 1 according to one embodiment of the present invention includes a server 2 and a processor 3. The server 2 includes a first storage 21, a first communicator 22, and a first controller 23. The first controller 23 includes a traffic information generator 24, a transmission destination determiner 25, and a communication controller 26. The first storage 21 stores first map data 27.

The processor 3 includes a current location detector 31, a second communicator 32, a second storage 33, a display 34, and a second controller 35. The second controller 35 includes an intersection searcher 36, a road searcher 37, a corrector 38, and a display controller 39. The second storage 33 stores second map data 40.

The first map data 27 and the second map data 40 indicate digital maps that represent the same road network by different data. These digital maps represent the road network formed by two or more roads intersecting with each other.

Figure 2:
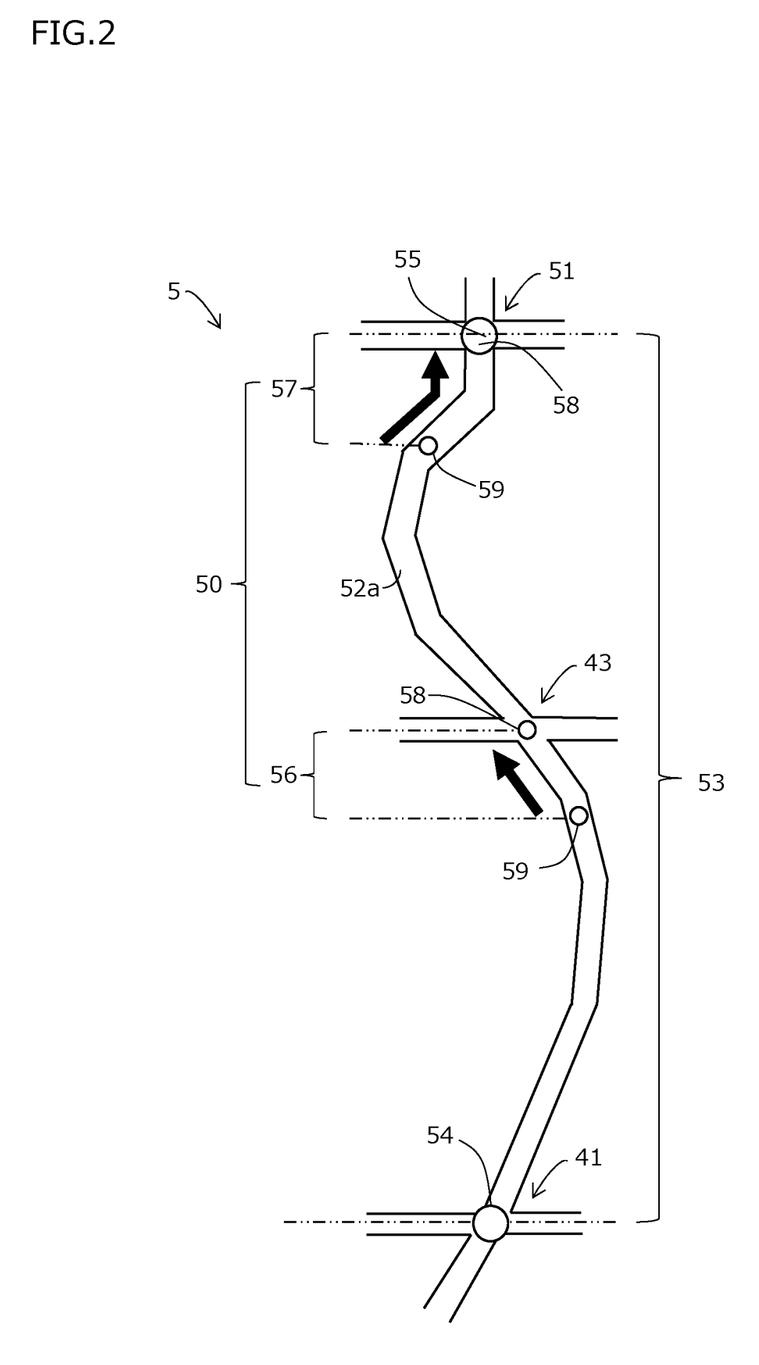
FIG. 2 is a diagram showing an image of a first road network represented by first map data.

Although the first map data 27 and the second map data 40 are data representing the same road network, road networks to be represented on the map are different in shape. A first road network 5 represented by the first map data 27 in FIG. 2 is different in shape from a second road network 7 represented by the second map data 40 in FIG. 5.

The processor 3 is mounted on a mobile unit 4. The mobile unit 4 may, for example, be an automobile, a two-wheeled vehicle, or an electric train. In the case where the mobile unit 4 is an automobile, the processor 3 may, for example, be a car navigation device. The processor 3 may also be any other device such as a smartphone, a digitizing tablet, or a notebook computer. The processing system 1 may include two or more processors 3.

In the processing system 1, the server 2 serves as a sending device, and the processor 3 severs as a receiving device. For example, the server 2 may be managed by an organization that provides Vehicle Information and Communication System (VICS (registered trademark)), or may be managed by a company that provides originally collected traffic information.

The communication controller 26 transmits road traffic information 60 to the processor 3 that displays a map within a predetermined range from a zone where there is a traffic jam or traffic control. The corrector 38 corrects the road traffic information 60 received via the second communicator 32 so as to make the road traffic information 60 correspond to the second map data 40. Based on the corrected traffic information 60, the second controller 35 performs control for, for example, notifying the driver of the mobile unit 4 about the traffic jam or traffic control.

Configuration of Server 2

The first storage 21 stores the first map data 27, programs for controlling the server 2, and various types of data or any other information necessary for the control of the server 2. For example, the first storage 21 may be configured as a semiconductor memory device such as RAM or flash memory, a hard disk, or an optical disk.

The first map data 27 represents the first road network 5 by nodes and links. The first road network 5 includes two or more first roads 52a intersecting with each other. The first road network 5 includes two or more intersections. Each node represents position data on a predetermined location such as an intersection and the end of a first road 52a.

Each link includes a link number for identifying a first road 52a that connects two nodes. The first map data 27 further includes directional data that indicates the direction of extension of each link by an angle, road type data that indicates the type of the first road 52a corresponding to each link, and data that indicates the length of each link.

The first communicator 22 may be configured as, for example, a network interface card (NIC). The server 2 communicates with the processor 3 via the first communicator 22.

The traffic information generator 24 generates the road traffic information 60 on the basis of the first map data 27. In order to generate the road traffic information 60, the traffic information generator 24 identifies a caution zone 50 and determines a first zone 53.

The caution zone 50 is a zone where there is a traffic jam, traffic control, or the like. Traffic control includes restrictions accompanied by traffic accidents or road constructions. The traffic information generator 24 identifies, as the caution zone 50, a zone where there is a traffic jam or traffic control in the first road network 5.

As shown in FIG. 2, the traffic information generator 24 identifies a zone that includes one or two or more caution zones 50 as the first zone 53. In order to identify the first zone 53, the traffic information generator 24 searches for, from among two or more nodes representing the first road network 5, two nodes that correspond to two locations connected to each other via a first road 52a that includes one or more caution zones 50. These locations may, for example, be intersections.

The traffic information generator 24 determines a zone between the two locations corresponding to the searched nodes as the first zone 53. The searched nodes become a starting point 54 and an end point 55 of the first zone 53. For example, the length of the first zone 53 may be set in accordance with at least either the scale or range of the second map data 40 to be displayed on the display 34. For example, the length of the first zone 53 may be set based on a mesh of the first map data 27 or the second map data 40. The length of the first zone 53 may also be set based on any factor other than the above-described factors. The traffic information generator 24 acquires position data on each searched node from among two or more nodes included in the first map data 27.

Figure 3:
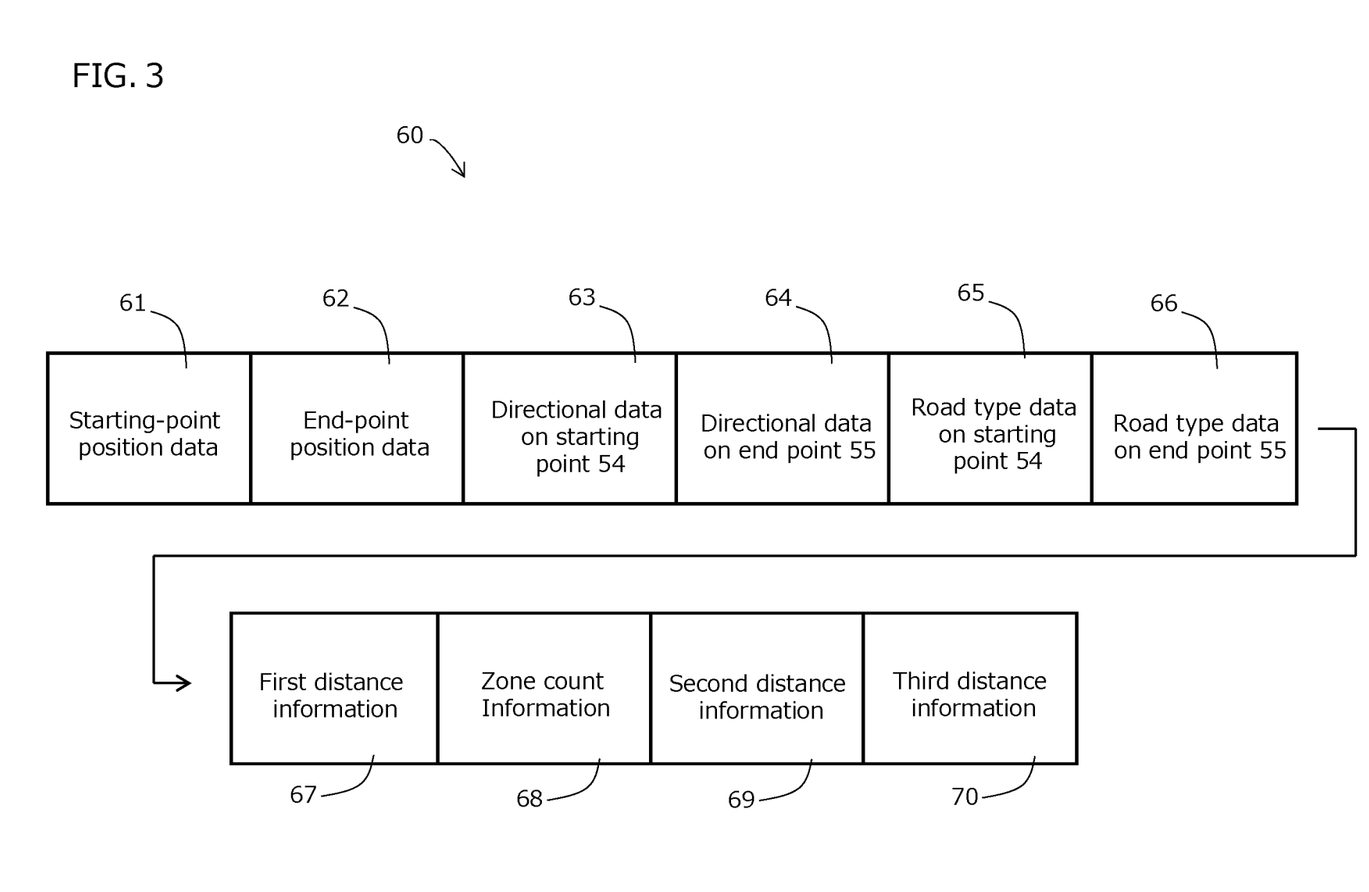
FIG. 3 is a diagram showing various types of information included in road traffic information.

The road traffic information 60 includes starting-point position data 61 and end-point position data 62 as shown in FIG. 3. The road traffic information 60 further includes directional data 63 on the starting point 54, directional data 64 on the end point 55, road type data 65 on the starting point 54, road type data 66 on the end point 55, first distance information 67, zone count information 68, second distance information 69, and third distance information 70. The road traffic information 60 may further include information that indicates the cause of presence of each caution zone 50, such as a traffic jam, traffic control, a traffic accident, or a road construction.

The starting-point position data 61 and the end-point position data 62 are each position data that corresponds to the node acquired from the first map data 27 by the traffic information generator 24 as described above. The starting point 54 and the end point 55 are each represented by the coordinates of latitude and longitude. The mobile unit 4 can run through the first zone 53 from the starting point 54 to the end point 55.

The directional data 63 on the starting point 54 indicates the direction of the link that is connected to the node corresponding to the starting point 54 in the first road network 5 among the links corresponding to the first zone 53, by an angle. The directional data 64 on the end point 55 indicates the direction of the link connected to the node corresponding to the end point 55 in the first road network 5 among the links corresponding to the first zone 53, by an angle.

The road type data 65 on the starting point 54 indicates the road type of the link that is connected to the node corresponding to the starting point 54 in the first road network 5 among the links corresponding to the first zone 53. The road type data 66 on the end point 55 indicates the road type of the link that is connected to the node corresponding to the end point 55 in the first road network 5 among the links corresponding to the first zone 53.

The first distance information 67 indicates the length of the first zone 53. That is, the first distance information 67 indicates the length of the first road 52a from the starting point 54 to the end point 55. The length of the first zone 53 is also referred to as the total road length. The zone count information 68 indicates the number of caution zones 50 included in the first zone 53.

The second distance information 69 is stored for each caution zone 50. The second distance information 69 indicates the length of the first road 52a from either the starting point 54 or the end point 55 of the first zone 53 to the caution zone 50. The second distance information 69 indicates the length of the first road 52a from the starting point 54 of the first zone 53 to a tail end 59 of the caution zone 50 shown in FIG. 2.

The second distance information 69 is, however, not limited to the above example, and may be any information that allows identification of the caution zone 50. Thus, the second distance information 69 may indicate the length of the first road 52a from either the starting point 54 or the end point 55 of the first zone 53 to a predetermined position in the caution zone 50. For example, the second distance information 69 may indicate the length of the first road 52a from the starting point 54 of the first zone 53 to a start position 58 of the caution zone 50 shown in FIG. 2. Alternatively, the second distance information 69 may indicate the length of the first road 52a from the end point 55 of the first zone 53 to either the start position 58 or the tail end 59 of the caution zone 50.

The third distance information 70 is stored for each caution zone 50. The third distance information 70 indicates the length of the caution zone 50. That is, the third distance information 70 indicates the length of the first road 52a from the start position 58 to the tail end 59 of the caution zone 50.

The first distance information 67, the second distance information 69, and the third distance information 70 are information for identifying the caution zone(s) 50 on the basis of the first zone 53. The number of pieces of second distance information 69 and the number of pieces of third distance information 70 included in the road traffic information 60 vary depending on the number of caution zones 50 included in the first zone 53. Note that other information may be used to identify where each caution zone 50 is located in the first zone 53, instead of using the second distance information 69 and the third distance information 70.

Figure 4:
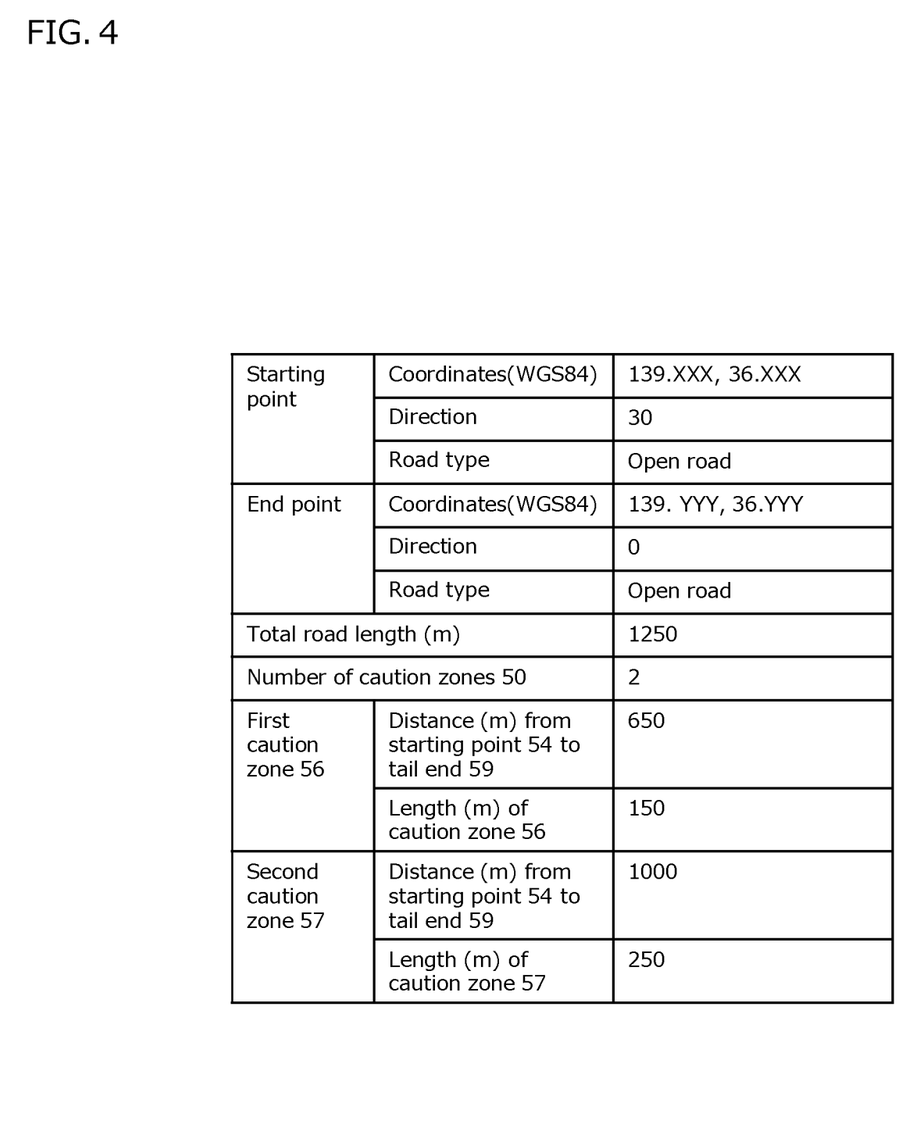
FIG. 4 is a diagram showing one example of the contents indicated by the road traffic information.

As shown by way of example in FIG. 4, the starting-point position data 61 indicates coordinates of 139.XXX, 36.XXX, the directional data 63 on the starting point 54 indicates an angle of 30°, and the road type data 65 on the starting point 54 indicates an open road as the road type. The end-point position data 62 indicates coordinates of 139.YYY, 36.YYY, the directional data 64 on the end point 55 indicates an angle of 0°, and the road type data 66 on the end point 55 indicates an open road as the road type.

The first distance information 67 indicates a length of 1250 m, and the zone count information 68 indicates 2 as the number of caution zones. In this example, the causes of presence of the caution zones 50 are traffic jams, and the second distance information 69 on the first caution zone indicates a length of 650 m, and the third distance information 70 on the first caution zone indicates a length of 150 m. The second distance information 69 on the second caution zone indicates a length of 1000 m, and the third distance information 70 on the second caution zone indicates a length of 250 m.

Note that the coordinates may be based on a geodetic coordinate system other than WGS84, which is the world geodetic system organized and administrated by the United States. In the following description, if there is a need to distinguish among two or more caution zones 50, the caution zones 50 are given different reference signs.

The transmission destination determiner 25 shown in FIG. 1 identifies a processor 3 that is mounted on a mobile unit 4 existing within a predetermined range from a caution zone 50, on the basis of the current location of the mobile unit 4. The predetermined range may, for example, be a radius of 1 km from the caution zone 50.

The communication controller 26 controls the first communicator 22 so that the road traffic information 60 is transmitted to the processor 3 identified by the transmission destination determiner 25.

The first controller 23 may be configured as, for example, a central processing unit (CPU) or a micro processing unit (MPU).

Configuration of Processor 3

The current location detector 31 detects the current location of the mobile unit 4 at predetermined time intervals. The current location detector 31 may be configured as, for example, a global positioning system (GPS) sensor. For example, the current location detector 31 may represent the current location of the mobile unit 4 by the coordinates of latitude and longitude.

The second communicator 32 may be configured as, for example, an NIC. The processor 3 communicates with the server 2 via the second communicator 32. The second communicator 32 transmits, to the server 2, current location data that indicates the current location detected by the current location detector 31. The second communicator 32 receives the road traffic information 60 from the server 2.

The second storage 33 stores the second map data 40, programs for controlling the processor 3, and various types of data or any other information necessary for the control of the processor 3. The second storage 33 may be configured as, for example, a semiconductor memory device such as RAM or flash memory, a hard disk, or an optical disk. The second storage 33 may also be configured as, for example, a secure digital (SD) memory card or universal serial bus (USB) memory that is insertable into the processor 3.

Figure 5:
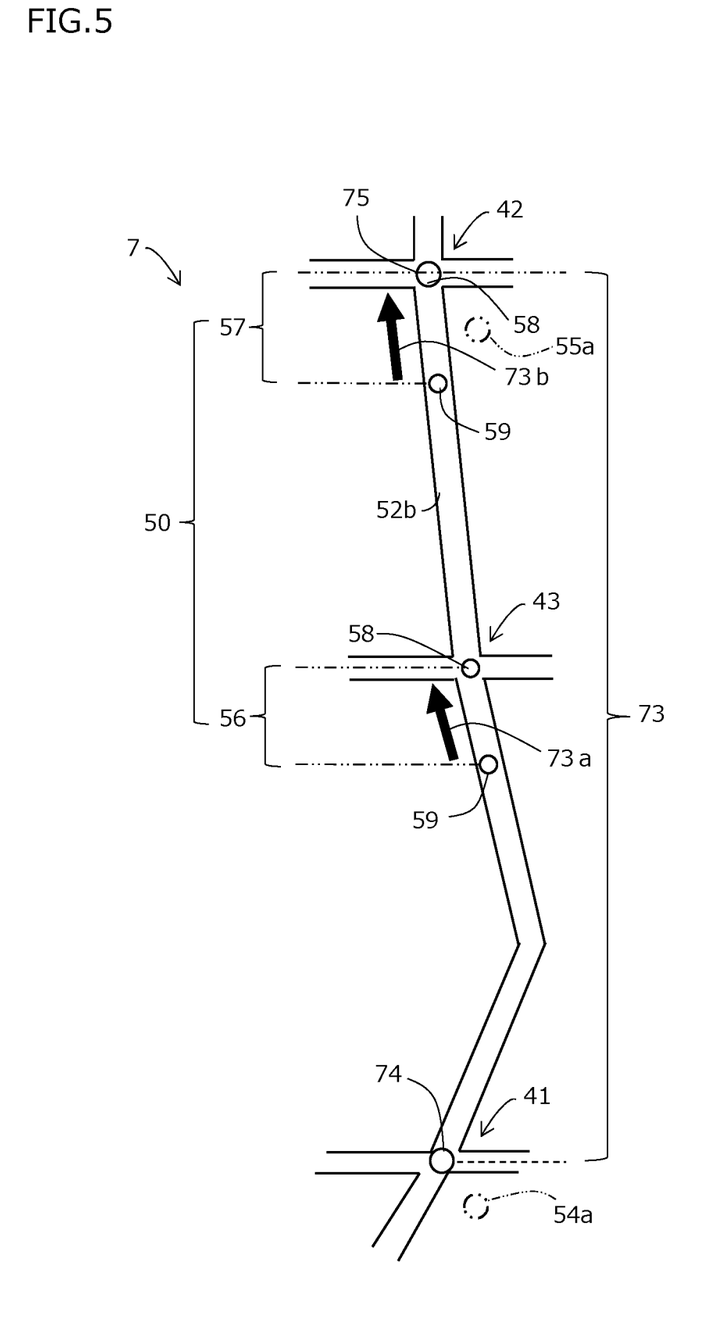
FIG. 5 is a diagram showing an image of a second road network represented by second map data.

The second map data 40 represents the second road network 7 shown in FIG. 5 by nodes and links. The second road network 7 includes two or more second roads 52b intersecting with each other. The second road network 7 includes two or more intersections. For example, the second map data 40 may include, as the nodes, position data that is different from the first map data 27. For example, the second map data 40 may include, as directional data and road type data, data that is different from the first map data 27. For example, the second map data 40 may include, as data indicating the length of each link, data that is different from the first map data 27.

Figure 7:
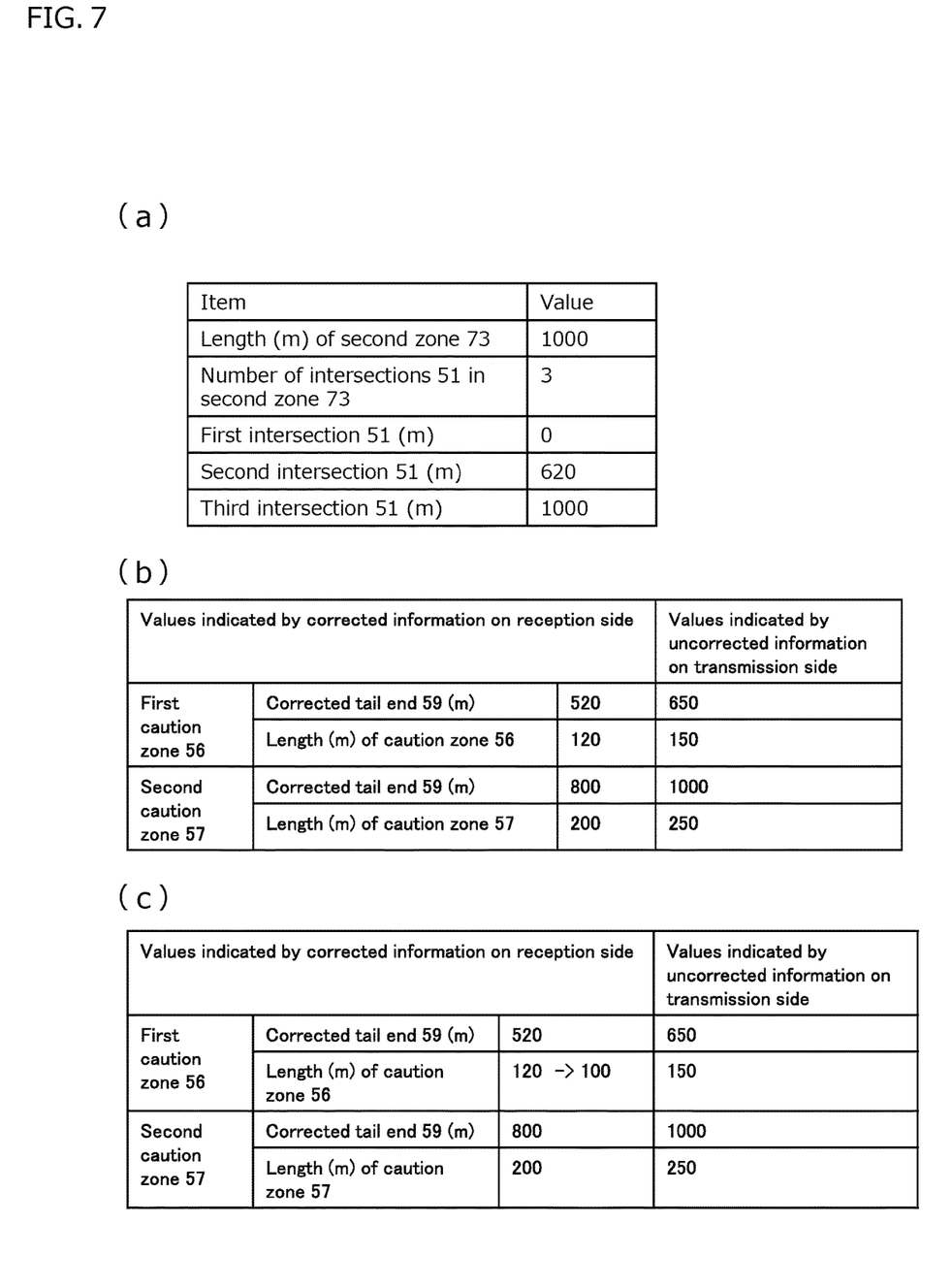
FIG. 7 is a diagram showing one example of the contents indicated by corrected road traffic information.

Even if the same road is targeted for, the road lengths obtained based on these digital maps become different because the digital maps are different in type. For example, the length of the first zone 53 calculated based on the first map data 27 is 1250 m as shown in FIG. 4, whereas the length of a second zone 73 calculated based on the second map data 40 is 1000 m as shown in FIG. 7(a).

The second zone 73 is a zone of the second road network 7 that corresponds to the first zone 53 of the first road network 5. The difference between the first map data 27 and the second map data 40 may be caused by, for example, a difference in map version or in map manufacturing company.

The display 34 shown in FIG. 1 displays a map based on the second map data 40. For example, the display 34 may display a map that shows caution zones 50 at positions corresponding to arrows 73a and 73b in FIG. 5.

In order to obtain the second zone 73, the intersection searcher 36 searches for an intersection that satisfies a predetermined condition from among intersections constituting the second road network 7. For example, the predetermined condition may be that the intersection be closest to the point 54a indicated by the starting-point position data 61. Alternatively, the predetermined condition may be that the intersection be closest to the point 55a indicated by the end-point position data 62.

The intersection searcher 36 acquires position data on a first intersection 41 that is closest to the point 54a indicated by the starting-point position data 61 and position data on a second intersection 42 that is closest to the point 55a indicated by the end-point position data 62 from among the nodes included in the second map data 40.

The predetermined condition may further include a condition concerning the direction of each second road 52b constituting the second road network 7. For example, the predetermined condition may be that the direction of the second road 52b that runs from the first intersection 41, which is closest to the point 54a indicated by the starting-point position data 61, toward the point 55a indicated by the end-point position data 62 should correspond to the directional data 63 on the starting point 54 included in the road traffic information 60. That is, the predetermined condition may be that the angle of the link corresponding to the second road 52b and the angle indicated by the directional data 63 on the starting point 54 match with each other or be within a predetermined angle.

The predetermined condition may also be that the direction of the second road 52b that runs from the second intersection 42, which is closest to the point 55a indicated by the end-point position data 62, toward the point 54a indicated by the starting-point position data 61 should correspond to the directional data 64 on the end point 55. That is, the predetermined condition may be that the angle of the link corresponding to the second road 52b and the angle indicated by the directional data 64 on the end point 55 match with each other or be within a predetermined angle.

The predetermined condition may further include a condition concerning the road type of each second road 52b constituting the second road network 7. For example, the predetermined condition may be that the road type of the second road 52b that runs from the first intersection 41, which is closest to the point 54a indicated by the starting-point position data 61, toward the point 55a indicated by the end-point position data 62 should correspond to the road type data 65 on the starting point 54. That is, the predetermined condition may be that the road type of the link corresponding to the second road 52b should match the road type indicated by the road type data 65 on the starting point 54.

The predetermined condition may also be that the road type of the second road 52b that runs from the second intersection 42, which is closest to the point 55a indicated by the end-point position data 62, toward the point 54a indicated by the starting-point position data 61 should correspond to the road type data 66 on the end point 55. That is, the predetermined condition may be that the road type of the link corresponding to the second road 52b should match the road type indicated by the road type data 66 on the end point 55.

The road searcher 37 may identify a start link and an end link under the three conditions described above. That is, the road searcher 37 identifies, as the start link, a link that corresponds to the directional data 63 on the starting point 54 and the road type data 65 on the starting point 54 from among the links of the second road network 7 that are connected to the node corresponding to the first intersection 41, which is closest to the point 54a indicated by the starting-point position data 61.

The road searcher 37 identifies, as the end link, a link that corresponds to the directional data 64 on the end point 55 and the road type data 66 on the end point 55 from among the links that are connected to the node corresponding to the second intersection 42, which is closest to the point 55a indicated by the end-point position data 62. Note that the road searcher 37 may identify the start link and the end link under any one of the three conditions described above.

The road searcher 37 may also be configured to, in the case where the first intersection 41 closest to the point 54a does not satisfy the condition concerning the direction of each second road 52b or the condition concerning the road type of each second road 52b, identify the start link and the end link on the basis of an intersection that is the next closest to the point 54 among the intersections constituting the second road network 7.

The road searcher 37 calculates the length of a road between the first intersection 41 and the second intersection 42 on the basis of the second map data 40 and the position data on the first and second intersections 41 acquired by the intersection searcher 36. For example, the road searcher 37 may search for a road between the start link and the end link by the Dijkstra's algorithm and calculate the length of the searched road.

The road searcher 37 searches for the length of the shortest route between the start link and the end link. The road searcher 37 also searches for two or more intersections on the road obtained as a result of the road search. For each searched intersection, the road searcher 37 calculates the length of the second road 52b between the intersection and a starting point 74, which will be described later.

In the case where the second distance information 69 indicates the length of the first road 52a from the end point 55 of the first zone 53 to either the start position 58 or the tail end 59 of the caution zone 50, the road searcher 37 may calculate the length of the second road 52b from the end point 75 to each intersection, instead of using the starting point 74.

The corrector 38 determines the second zone 73 in accordance with the result of comparison between the length of the first zone 53 indicated by the first distance information 67 and the length of the road calculated by the road searcher 37. In the case where a difference between the length of the first zone 53 and the length of the road calculated by the road searcher 37 is smaller than a predetermined first reference value, the corrector 38 determines the road between the first intersection 41 and the second intersection 42, searched for by the intersection searcher 36, as the second zone 73.

The fact that the difference between the length of the first zone 53 and the length of the road is smaller than the first reference value means that the road between the node connected to the start link and the node connected to the end link corresponds to the first zone 53. In order to determine whether the difference is smaller than the first reference value, the corrector 38 calculates a distance ratio (C) in accordance with Expression (1). The distance ratio (C) refers to the ratio of the difference in length.

[Math. 1]

$$\text{Distance Ratio}(c) = \left| \frac{\text{Road Length}}{\text{Length of First Zone 53}} \times 100 - 100 \right| \quad (1)$$

In Expression (1), "Road Length" represents the length of the road calculated by the road searcher 37, and "Length of First Zone 53" represents the length of the first zone 53 indicated by the first distance information 67.

The corrector 38 tolerates a certain degree of the distance ratio (C). For example, the first reference value may be 30%. If the distance ratio (C) is less than 30%, for example, the corrector 38 may determine that the target road matches the first zone 53 and determine the road between the first intersection 41 and the second intersection 42, searched for by the intersection searcher 36, as the second zone 73.

In the case where the distance ratio (C) is 30% or higher, the road searcher 37 may have searched for a different road that does not correspond to the first zone 53, and the corrector 38 determines that the road searched for by the road searcher 37 is not the road corresponding to the first zone 53. Note that the first reference value is not limited to 30%. For example, the first reference value may be a value greater than or equal to 20% and less than or equal to 40%.

The second controller 35 is capable of correcting the starting point 54 and the end point 55 of the first zone 53 in correspondence with the second map data 40 as described above and acquires, as corrected data, position data on each of the starting point 74 and the end point 75 of the second zone 73.

Although the corrector 38 determines the second zone 73 on the basis of the ratio between the length of the first zone 53 and the length of the road calculated by the road searcher 37, the configuration of the corrector 38 is not limited to this example. For example, in the case where the difference between the length of the first zone 53 and the length of the road calculated by the road searcher 37 is 5 m or less, the corrector 38 may determine the road between the intersections searched for by the intersection searcher 36 as the second zone 73.

FIG. 7(a) shows one example of the values related to the second zone 73. By way of example, the second zone 73 includes three intersections including the starting point 74 and the end point 75. Referring to the length of the second road 52b between each intersection and the starting point 74, the length between the first intersection 41 and the starting point 74 is 0 m, the length between a third intersection 43 and the starting point 74 is 620 m, and the length between the second intersection 42 and the starting point 74 is 1000 m.

Here, if the processor 3 uses the length indicated by the second distance information 69 as-is without correcting the second distance information 69, the display 34 may not be able to properly display the caution zones 50 on the map.

For example, as shown in FIG. 4, the length of the first road 52a from the starting point 54 to the tail end 59 of a second caution zone 57 is 1000 m, but the length of the second zone 73 is also 1000 m as shown in FIG. 7(a). In this case, as shown in FIG. 6, the second caution zone 57 will be displayed at a position beyond the end point 75 of the second zone 73 as indicated by an arrow 71 with a chain double-dashed line.

Figure 6:
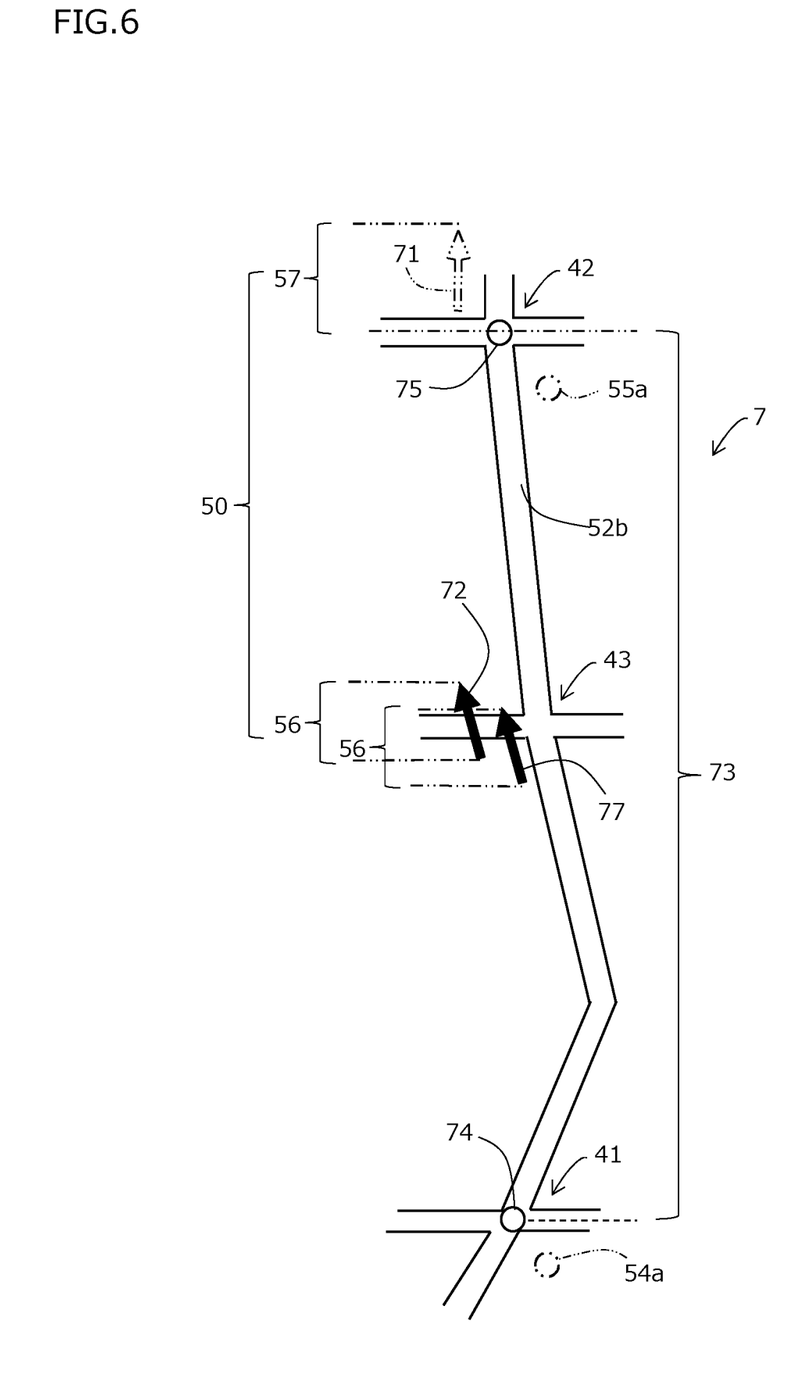
FIG. 6 is a diagram for describing caution zones based on uncorrected road traffic information.

In the case where a first caution zone 56 is a zone that ends at the third intersection 43 located at the midpoint in the first zone 53 and if the first caution zona 56 is represented by simply the length from the starting point 54, the processor 3 will display an arrow 72 at a displaced position as shown in FIG. 6.

In order to correct each caution zone 50, the corrector 38 calculates a distance correction value (α) that is the ratio between the length of the first zone 53 and the length of the second zone 73, in accordance with Expression (2).

[Math. 2]

$$\text{Distance Correction Value}(\alpha) = \frac{\text{Road Length}}{\text{Length of First Zone 53}} \quad (2)$$

In Expression (2), "Road length" represents the length of the road calculated by the road searcher 37. The corrector 38 obtains the length of the first zone 53 from the first distance information 67.

Next, the corrector 38 calculates a corrected length (L1) from the starting point 54 of the first zone 53 to the tail end 59 of the caution zone 50 in accordance with Expression (3). Length (L1) is the length from the starting point 74 of the second zone 73 to the tail end 59 of the caution zone 50.

[Math. 3]

$$\text{Length}(L1) = \text{Length from Starting Point 54 to Tail End 59} \times \alpha \quad (3)$$

In Expression (3), "Length from Starting point 54 to Tail End 59" represents the length of the first road 52a from the starting point 54 of the first zone 53 to the tail end 59 of the caution zone 50. The corrector 38 obtains the length from the starting point 54 to the tail end 59 from the second distance information 69.

The corrector 38 calculates a corrected length (L2) of the caution zone 50 in the first zone 53 in accordance with Expression (4). That is, Length (L2) represents the length of the caution zone 50 in the second zone 73.

[Math. 4]

$$\text{Length}(L2) = \text{Length of Caution Zone 50} \times \alpha \quad (4)$$

In the case where the second distance information 69 indicates the length of the first road 52a from the end point 55 of the first zone 53 to the tail end 59 of the caution zone 50, the corrector 38 may calculate the length based on the end point 75 of the second zone 73 as Length (L1).

In Expression (4), the length of the caution zone 50 represents the length of the caution zone 50 in the first road network 5. The corrector 38 obtains the length of the caution zone 50 from the third distance information 70. Here, α is calculated from Expression (2).

By way of example shown in FIG. 7(b), "Corrected Tail End 59" represents the length from the starting point 74 of the second zone 73 to the tail end 59. The length from the starting point 74 to the tail end 59 of the first caution zone 56 is 520 m, and the length from the starting point 74 to the tail end 59 of the second caution zone 57 is 800 m. Referring to the length of each caution zone 50 in the second road network 7, the length of the first caution zone is 120 m, and the length of the second caution zone 57 is 200 m.

The corrector 38 is capable of correcting each caution zone 50 in accordance with the distance between the start position 58 of the caution zone 50 in the second zone 73 and each intersection included in the second zone 73.

Correcting the caution zone 50 may be equivalent to, for example, correcting the start position 58 of the caution zone 50 to the first intersection 41 that is close to the start position 58. This takes into consideration the feature that a traffic jam occurs starting from an intersection and, for example, reduces the occurrence of situations where an unnatural position past the intersection, such as the position corresponding to an arrow 71 in FIG. 6, may be determined as the start position 58.

In the case where the length (L2) calculated from Expression (4) is greater than or equal to a predetermined second reference value and the length of the second road 52b between an intersection and the start position 58 of the caution zone 50 in the second zone 73 is less than or equal to a third reference value, the corrector 38 determines this intersection as the start position 58 of the caution zone 50.

The second reference value may, for example, be 40 m. Note that the second reference value is not limited to 40 m. The second reference value may, for example, be a value greater than or equal to 30 m and less than or equal to 50 m.

In order to correct the start position 58 of the caution zone 50 in the second zone 73 to the first intersection 41, the corrector 38 calculates a corrected length (L3) from the starting point 54 to the start position 58 in the first road network 5 in accordance with Expression (5). That is, the length (L3) represents the length of the second road 52b from the starting point 74 to the start position 58 of the caution zone 50 in the second zone 73.

[Math. 5]

$$\text{Length}(L3) = L1 + L2 \quad (5)$$

Next, the corrector 38 calculates a length (L4) of the second road 52b between the first intersection 41 and the start position 58 of each caution zone 50 in the second zone 73 in accordance with Expression (6).

[Math. 6]

$$\text{Length}(L4) = \\ |L3 - \text{Length from Starting Point 74 to First Intersection 41}| \quad (6)$$

Length from Starting Point 74 to First Intersection 41 represents the length of the second road 52b from the starting point 74 of the second zone 73 to any one of the intersections included in the second zone 73. The length from the starting point 74 to each intersection in the second zone 73 is calculated by the road searcher 37.

Note that the corrector 38 may be configured to use the end point 75 as a reference, instead of using the starting point 74, when obtaining the length of the second road 52b from the start position 58 to each intersection in the second zone 73. In the case where the length of the second road 52b from the start position 58 to an intersection is less than or equal to the third reference value, the corrector 38 may determine this intersection as the start position 58.

The corrector 38 may also be configured to, once having found an intersection that satisfies the condition that the length of the second road 52b from the intersection to the start position 58 is less than or equal to the third reference value, stop the search for the remaining intersections. The third reference value may be 20 m. Note that the third reference value is not limited to 20 m. For example, the third reference value may be a value greater than or equal to 10 m and less than or equal to 30 m.

As a result of the correction by the corrector 38, as shown by way of example in FIG. 7(c), the length of the first caution zone 56 is corrected to 100 m. Accordingly, the start position 58 of the caution zone 56 is corrected from the position indicated by the arrow 72 in FIG. 6 to the position indicated by the arrow 77.

By using the second distance information 69 and the third distance information 70 corrected by the corrector 38, the display controller 39 is capable of causing the display 34 to display the first caution zone 56 at an appropriate position corresponding to the arrow 73a in FIG. 5 and display the second caution zone 57 at an appropriate position corresponding to the arrow 73b in FIG. 5.

Since the second controller 35 obtains each caution zone 50 in the second zone 73 by using the starting point 74 of the second zone 73 and the length of the second road 52b from the starting point 74, it is possible to appropriately obtain the start position 58 or the tail end 59 of the caution zone 50 that does not correspond to the node in the second map data 40.

In the case where the second distance information 69 and the third distance information 70 are not corrected, the display controller 39 may cause the display 34 to display each caution zone 50 based on the uncorrected second distance information 69 and the uncorrected third distance information 70.

In the case where the difference between the length of the first zone 53 and the length of the road calculated by the road searcher 37 has been determined not to be smaller than the predetermined first reference value, the corrector 38 may determine that there is no road corresponding to the first zone 53. In this case, it is conceivable, as indicated by the arrow 71 in FIG. 6, that the caution zone 57 indicated by the uncorrected second distance information 69 and the uncorrected third distance information 70 may deviate from the zone between the point 54a indicated by the starting-point position data 61 and the point 55a indicated by the end-point position data 62 in the second road network 7.

In this case, the display controller 39 may prevent the display 34 from displaying the caution zone 57. Alternatively, in the case where the length of the second road 52b between the caution zone 57 and either the point 54a indicated by the starting-point position data 61 or the point 55a indicated by the end-point position data 62 is less than a predetermined value, the display controller 39 may cause the display 34 to display a caution zone 57 whose start position 58 is the intersection closest to the caution zone 57 in the second road network 7.

The second controller 35 may, for example, be a CPU or an MPU. The intersection searcher 36, the road searcher 37, the corrector 38, and the display controller 39 are each realized by, for example, the CPU or the MPU executing programs stored in the second storage 33. The processor 3 with the above-described configuration corresponds to a computer.

Second-Zone Calculation Processing

Figure 8:
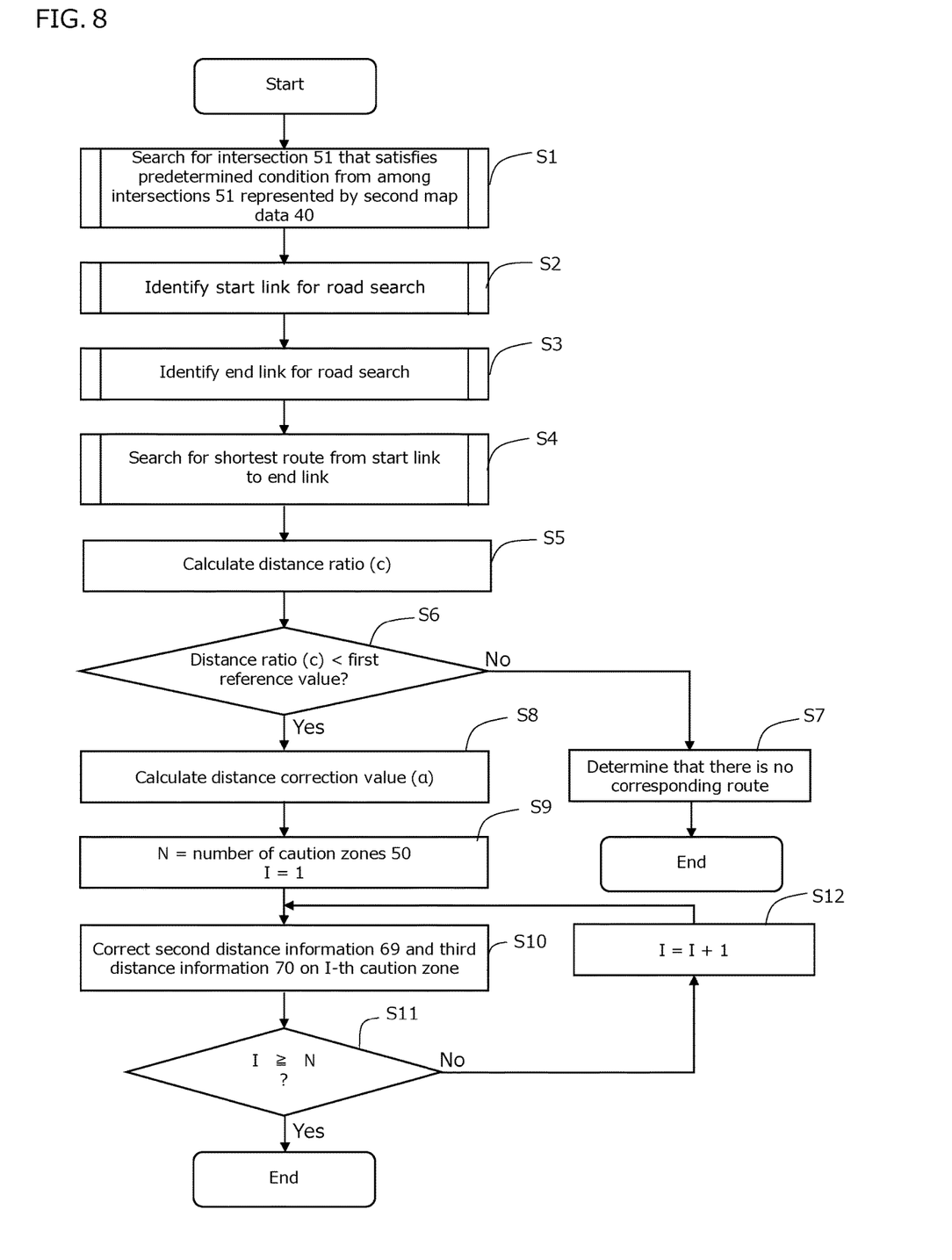
FIG. 8 is a flowchart showing second-zone calculation processing.

The processor 3 generates position data that indicates each of the starting point 74 and the end point 75 of the second zone 73 in accordance with, for example, second-zone calculation processing shown in FIG. 8. The second controller 35 executes the second-zone calculation processing upon receiving the road traffic information 60 from the server 2. Here, the second-zone calculation processing will be described with reference to the flowchart shown in FIG. 8. A symbol "S" means a step.

In processing performed in S1, the intersection searcher 36 searches for two intersections that satisfy a predetermined condition from among intersections represented by the second map data 40. One of the two intersections is closest to the point 54a corresponding to the starting point 54 of the first zone 53. The other intersection is closest to the point 55a corresponding to the end point 55.

In processing performed in S2, the road searcher 37 identifies a start link that corresponds to the intersection searched for in S1 on the basis of the second map data 40.

In processing performed in S3, the road searcher 37 identifies an end link that corresponds to the intersection searched for in S1 on the basis of the second map data 40.

In processing performed in S4, the road searcher 37 searches for the shortest route from the start link obtained in S2 to the end link obtained in S3 on the basis of the second map data 40.

In processing performed in S5, the corrector 38 calculates the distance ratio (C) on the basis of the length of the first zone 53 and the length of the shortest route searched for in S4 in accordance with Expression (1) given above.

In processing performed in S6, the corrector 38 determines whether the distance ratio (C) is less than the first reference value. When the distance ratio (C) is determined to be higher than or equal to the first reference value, the corrector 38 determines that there is no road corresponding to the first zone 53 in S7, and ends the second-zone determination processing.

When the distance ratio (C) is determined to be less than the first reference value, the corrector 38 determines the zone between the two intersections searched for in S1 as the second zone 73, and the processing proceeds to S8.

In processing performed in S8, the corrector 38 calculates the distance correction value ($\alpha$) on the basis of the length of the first zone 53 and the length of the second zone 73 determined in S6 in accordance with Expression (2).

In processing performed in S9, the corrector 38 substitutes the number of caution zones 50 included in the first zone 53 into a variable N and substitutes one into a variable I, where N is an integer.

In processing performed in S10, the corrector 38 corrects the second distance information 69 and the third distance information 70 on the basis of the calculated distance correction value ($\alpha$) in accordance with Expressions (3) and (4).

In processing performed in S11, the corrector 38 determines whether the value of the variable I is greater than or equal to the value of the variable N. When the value of the variable I is less than the value of the variable N, the corrector 38 proceeds the second-zone determination processing to S12 in order to increment the value of the variable I by one and returns the processing to S10.

When the value of the variable I is greater than or equal to the value of the variable N, the corrector 38 ends the second-zone determination processing. That is, the corrector 38 performs the processing in S10 for every caution zone 50.

Start-Position Correction Processing

Figure 9:
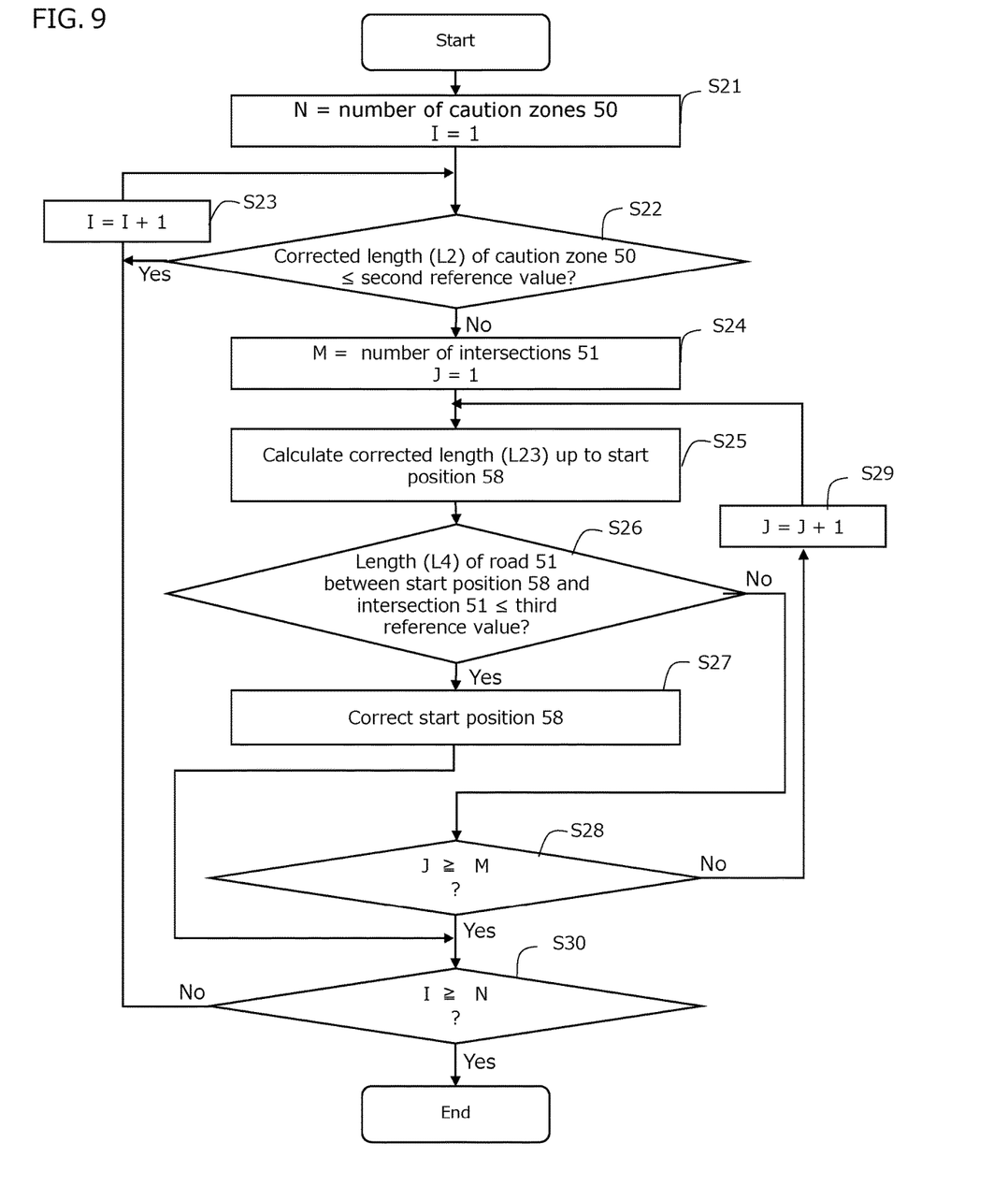
FIG. 9 is a flowchart showing start-position correction processing.

The processor 3 corrects the start position 58 of each caution zone 50 included in the second zone 73 in accordance with, for example, start-position correction processing shown in FIG. 9. The start-position correction processing is started after the second-zone determination processing.

In processing performed in S21, the corrector 38 substitutes the number of caution zones 50 included in the first zone 53 into a variable N and substitutes one into a variable I, where N is an integer.

In processing performed in S22, the corrector 38 determines whether the corrected length (L2) of the first caution zone 56 is less than or equal to the second reference value.

When the corrected length (L2) of the caution zone 56 is less than or equal to the second reference value, the corrector 38 proceeds the start-position correction processing proceeds to S23 in order to increment the variable I by one and returns the processing to S22.

When the processing in S22 is performed the second time, the corrector 38 determines whether the corrected length (L2) of the second caution zone 57 is less than or equal to the second reference value. When the corrected length (L2) of the caution zone 56 exceeds the second reference value, the corrector 38 proceeds the start-position correction processing to S24.

In processing performed in S24, the corrector 38 substitutes the number of intersections included in the shortest route searched for in S4 shown in FIG. 8 into a variable M and substitutes one into a variable J, where M is an integer.

In processing performed in S25, the corrector 38 calculates the length (L3) of the second road 52b from the starting point 74 to the start position 58 in accordance with Expression (5).

In processing performed in S26, the corrector 38 determines whether the length (L4) of the second road 52b between the start position 58 and the intersection is greater than or equal to the third reference value, in accordance with Expression (6). When the length (L4) is less than or equal to the third reference value, the corrector 38 corrects the start position 58 of the caution zone 56 to the J-th intersection in S27. When the length (L4) exceeds the third reference value, the corrector 38 proceeds the start-position correction processing to S28.

In processing performed in S28, the corrector 38 determines whether the variable J is greater than or equal to the variable M. When the variable J is less than the variable M, the corrector 38 proceeds the start-position correction processing to S29 in order to increment the variable J by one and returns the processing to S25. When the value of the variable J is greater than or equal to the variable M, the corrector 38 proceeds the start-position correction processing to S30.

In processing performed in S30, the corrector 38 determines whether the variable I is greater than or equal to the variable N. When the variable I is less than the variable N, the corrector 38 proceeds the start-position correction processing to S23 in order to increment the variable I by one and returns the processing to S22. When the variable I is greater than or equal to the variable N, the corrector 38 ends the start-position correction processing. In this way, the start positions 58 of all the caution zones 50 included in the second zone 73 are corrected to appropriate intersections.

Note that the configuration of the processor is not limited to the above-described embodiment. For example, although in the above-described embodiment, the display 34 is caused to display the map showing the caution zones 56 and 57, the map may be used as support information for controlling an accelerator or a brake of the mobile unit 4 on the basis of the corrected road traffic information 60, or the map may be used for audio guidance.

Although in the processing system 1 according to the above-described embodiment, each caution zone 50 is included in the first zone 53, the processing system 1 may set a caution zone 50 as the first zone 53 and perform the second-zone calculation processing and the start-position correction processing.

The present invention also includes a processing method for use in the processor, a program described below, and a recording medium that records the program thereon.

A program is for storing map data that includes position data on a plurality of intersections connected to a plurality of roads and for causing a computer to execute processing for displaying a map on the basis of the map data. The processing includes the step of receiving road traffic information that includes starting-point position data, end-point position data, first distance information, and second distance information, the starting-point position data indicating a starting point of a first zone, the end-point position data indicating an end point of the first zone, the first distance information indicating a length of the first zone, the second distance information indicating a length from either the start point or the end point to either a start position or a tail end of a caution zone where there is a traffic jam or traffic control; the step of identifying a first intersection whose distance from the starting point satisfies a predetermined condition and a second intersection whose distance from the end point satisfies a predetermined condition from the map data; the step of calculating a distance ratio that is a ratio between the length of the first zone and a length of a road that connects the first intersection and the second intersection; the step of, when the distance ratio is smaller than a first reference value, determining the road as a second zone that corresponds to the first zone; the step of calculating a distance correction value that is a ratio between the length of the first zone and a length of the second zone; the step of correcting a length indicated by the second distance information by using the distance correction value; and the step of displaying the map that shows the caution zone by the length corrected and indicated by the second distance information.

While the embodiment and advantageous effects of the present disclosure have been described thus far, various modifications, additions, and omissions can be made thereto by those skilled in the art without departing from the scope of the present invention described clearly in the claims.

REFERENCE SIGNS LIST 3 processor
7 second road network
32 second communicator
33 second storage
34 display
35 second controller
40 second map data
41 first intersection
42 second intersection
43 third intersection
52b second road
53 first zone
56, 57 caution zone
61 starting-point position data
62 end-point position data
63 second zone
67 first distance information
69 second distance information
70 third distance information
74 starting point of second zone
75 end point of second zone

The invention claimed is:
1. A processor comprising:
a communicator that receives road traffic information including starting-point position data, end-point position data, first distance information, second distance information, and third distance information, the starting-point position data indicating a starting point of a first zone, the end-point position data indicating an end point of the first zone, the first distance information indicating a length of the first zone, the second distance information indicating a length from either the starting point or the end point to either a start position or a tail end of a caution zone where there is a traffic jam or traffic control, the third distance information indicating a length of the caution zone;

a storage that stores map data including position data on a plurality of nodes connected to a plurality of links;

a display that displays a map in accordance with the map data; and a controller that identifies a first node whose distance from the starting point satisfies a predetermined condition and a second node whose distance from the end point satisfies a predetermined condition from the map data; calculates a distance ratio that is a ratio between the length of the first zone and a length of a link that connects the first node and the second node; when the distance ratio is smaller than a first reference value, determines the link as a second zone that corresponds to the first zone; calculates a distance correction value that is a ratio between the length of the first zone and a length of the second zone; corrects the length indicated by the second distance information and the length of the caution zone by using the distance correction value; and causes the display to display the map that shows the caution zone by the length corrected and indicated by the second distance information and the length of the caution zone corrected, wherein:

the map data further includes directional data that indicates a road direction of each of the plurality of links, and road type data that indicates a road type of each of the plurality of links;

the road traffic information further includes first directional data that indicates a road direction of the first zone, and first road type data that indicates a road type of the first zone; and the predetermined condition is any of a condition that a node is closest to the starting point or the end point, a condition that a node is connected to a link whose directional data indicates a road direction that matches the road direction indicated by the first directional data or that is within a predetermined angle including the road direction indicated by the first directional data, or a condition that a node is connected to a link whose road type data matches the first road type data.

2. A processing method for use in a processor that stores map data and displays a map in accordance with the map data, the map data including position data on a plurality of nodes connected to a plurality of links, the processing method comprising:

receiving road traffic information that includes starting-point position data, end-point position data, first distance information, second distance information, and the third distance information, the starting-point position data indicating a starting point of a first zone, the end-point position data indicating an end point of the first zone, the first distance information indicating a length of the first zone, the second distance information indicating a length from either the starting point or the end point to either a start position or a tail end of a caution zone where there is a traffic jam or traffic control, the third distance information indicating a length of the caution zone;

identifying a first node whose distance from the starting point satisfies a predetermined condition and a second node whose distance from the end point satisfies a predetermined condition from the map data;

calculating a distance ratio that is a ratio between the length of the first zone and a length of a link that connects the first node and the second node;

when the distance ratio is smaller than a first reference value, determining the link as a second zone that corresponds to the first zone;

calculating a distance correction value that is a ratio between the length of the first zone and a length of the second zone;

correcting a length indicated by the second distance information and the length of the caution zone by using the distance correction value; and displaying the map that shows the caution zone by the length corrected and indicated by the second distance information and the length of the caution zone corrected, wherein:

the map data further includes directional data that indicates a road direction of each of the plurality of links, and road type data that indicates a road type of each of the plurality of links;

the road traffic information further includes first directional data that indicates a road direction of the first zone, and first road type data that indicates a road type of the first zone; and the predetermined condition is any of a condition that a node is closest to the starting point or the end point, a condition that a node is connected to a link whose directional data indicates a road direction that matches the road direction indicated by the first directional data or that is within a predetermined angle including the road direction indicated by the first directional data, or a condition that a node is connected to a link whose road type data matches the first road type data.

3. A non-transitory computer-readable medium storing instructions for a processor that stores map data and displays a map in accordance with the map data, the map data including position data on a plurality of nodes connected to a plurality of links, the instruction causing the processor to:

receive road traffic information that includes starting-point position data, end-point position data, first distance information, second distance information, and the third distance information, the starting-point position data indicating a starting point of a first zone, the end-point position data indicating an end point of the first zone, the first distance information indicating a length of the first zone, the second distance information indicating a length from either the starting point or the end point to either a start position or a tail end of a caution zone where there is a traffic jam or traffic control, the third distance information indicating a length of the caution zone;

identify a first node whose distance from the starting point satisfies a predetermined condition and a second node whose distance from the end point satisfies a predetermined condition from the map data;

calculate a distance ratio that is a ratio between the length of the first zone and a length of a link that connects the first node and the second node;

when the distance ratio is smaller than a first reference value, determine the link as a second zone that corresponds to the first zone;

calculate a distance correction value that is a ratio between the length of the first zone and a length of the second zone;

correct a length indicated by the second distance information and the length of the caution zone by using the distance correction value; and display the map that shows the caution zone by the length corrected and indicated by the second distance information and the length of the caution zone corrected, wherein:

the map data further includes directional data that indicates a road direction of each of the plurality of links, and road type data that indicates a road type of each of the plurality of links;

the road traffic information further includes first directional data that indicates a road direction of the first zone, and first road type data that indicates a road type of the first zone; and the predetermined condition is any of a condition that a node is closest to the starting point or the end point, a condition that a node is connected to a link whose directional data indicates a road direction that matches the road direction indicated by the first directional data or that is within a predetermined angle including the road direction indicated by the first directional data, or a condition that a node is connected to a link whose road type data matches the first road type data.

\* \* \* \* \*